United States Patent [19]

Phillips et al.

[11] Patent Number: 4,719,349

[45] Date of Patent: Jan. 12, 1988

[54] ELECTROCHEMICAL SAMPLE PROBE FOR USE IN FAST-ATOM BOMBARDMENT MASS SPECTROMETRY

[75] Inventors: Lawrence R. Phillips, Gaithersburg, Md.; John E. Bartmess, Knoxville, Tenn.

[73] Assignee: The United States of America as represented by the Department of Health and Human Services, Washington, D.C.

[21] Appl. No.: 867,013

[22] Filed: May 27, 1986

[51] Int. Cl.$^4$ .......... B01D 59/44

[52] U.S. Cl. .......... 250/288; 250/440.1

[58] Field of Search .......... 250/281, 288, 440.1, 250/442.1, 425

[56] References Cited

U.S. PATENT DOCUMENTS

| | | | |
|---|---|---|---|
| 2,767,317 | 10/1956 | Wiley | 250/287 |
| 3,480,775 | 11/1969 | Osborne . | |
| 3,590,243 | 6/1971 | Perrin et al. . | |
| 3,621,240 | 11/1971 | Cohen et al. . | |
| 3,783,280 | 1/1974 | Watson | 250/305 |
| 3,792,251 | 2/1974 | Schmidt | 250/425 |
| 3,842,266 | 10/1974 | Thomas | 250/288 |
| 3,881,108 | 4/1975 | Kondo et al. | 250/307 |
| 3,931,516 | 1/1976 | Fletcher et al. | 250/281 |
| 3,939,344 | 2/1976 | McKinney | 250/281 |
| 3,949,221 | 4/1975 | Liebl | 250/281 |
| 3,970,854 | 7/1976 | Boroffka et al. | 250/281 |
| 3,999,065 | 12/1975 | Briggs | 250/281 |
| 4,047,030 | 9/1977 | Lobach | 250/281 |
| 4,122,343 | 10/1978 | Risby et al. | 250/282 |
| 4,439,679 | 3/1984 | McIlroy et al. | 250/282 |
| 4,465,935 | 8/1984 | Von Criegern | 250/440.1 |
| 4,521,687 | 6/1985 | Naito | 250/296 |
| 4,562,351 | 12/1985 | Altherton et al. | 250/288 |
| 4,611,120 | 9/1986 | Bancroft et al. | 250/440.1 |
| 4,620,103 | 10/1986 | Kambara et al. | 250/288 |

FOREIGN PATENT DOCUMENTS

| | | | |
|---|---|---|---|
| 136610 | 4/1985 | European Pat. Off. | 250/288 |

OTHER PUBLICATIONS

"Detector for the Metastable Ions Observed in the Mass Spectra of Organic Compounds", The Review of Scientific Instruments, vol. 39, No. 8, Aug. 1968, by N. R. Daly, A. McCormick and R. E. Powell.

"New Sample Supply Technique for Field Desorption Mass Spectrometry", Linden et al., *J. Phys. E. Sci. Inst.*, vol. 10, No. 6, 6-77, pp. 657-660, 250-288.

*Primary Examiner*—Bruce C. Anderson

*Attorney, Agent, or Firm*—Browdy and Neimark

[57] ABSTRACT

The utilization of a dual electrode sample probe in a mass spectrometer allows several distinct advantages in chemical analysis when compared to common conventional single electrode sample probes, including production of structurally significant ions, and the ability to provide a direct means to study electrochemical reactions.

14 Claims, 5 Drawing Figures

FIG. 3
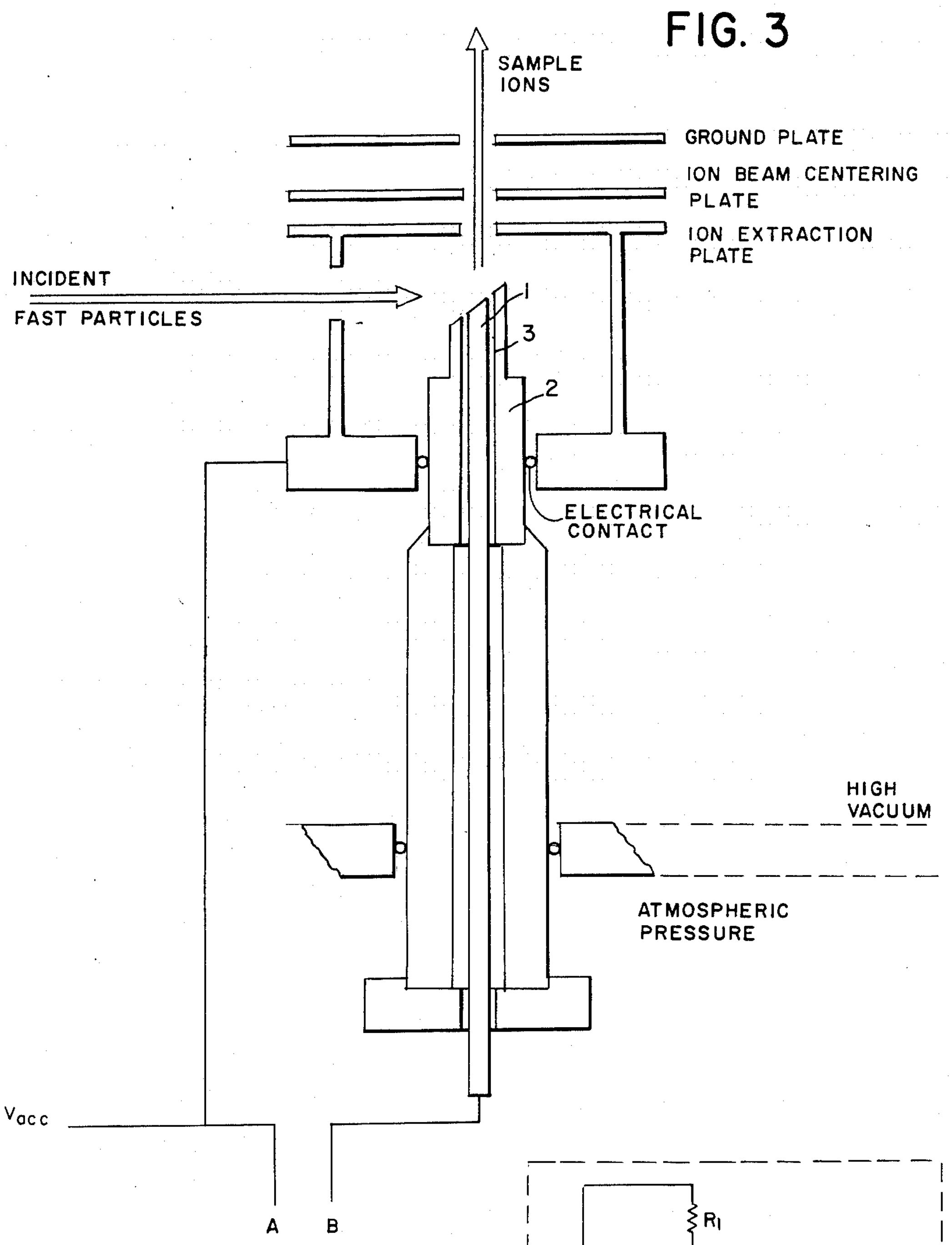
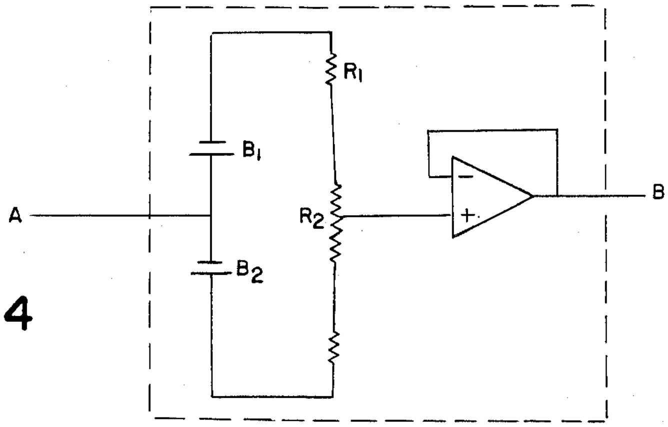
FIG. 4

ELECTROCHEMICAL SAMPLE PROBE FOR USE IN FAST-ATOM BOMBARDMENT MASS SPECTROMETRY

FIELD OF INVENTION

The present invention relates to improvements in mass spectrometry and, more particularly, to a system embodying dual electrodes which enables mass spectrometry to be carried out on subject materials which could not previously be so analyzed, and which provides simpler, more efficient and faster mass spectrometry with regard to subject materials normally analyzed by mass spectrometry.

BACKGROUND OF THE INVENTION

Mass spectrometry is a branch of analytical chemistry. A mass spectrometer is a device that could be said to be constructed of four basic system building blocks: (a) sample inlet system; (b) sample ionization; (c) sample ion analyzer; and (d) sample ion detection and recording. Generally, sample ionization and sample ion analyzing (b) and (c) are performed in a high vacuum, whereas, depending on methodology used, sample inlet system and ion detection and recording may or may not be included in the same high vacuum. Modern mass spectrometers tend to rely heavily upon computers to control many of their functions, as well as to collect and process the chemical data obtained.

Much basic research as well as routine quality control operations rely on mass spectrometry to provide certain data for primary identification and/or verification of the correctness of chemical structure. With a particular chemical sample in hand, the analysis commences with some form of sample introduction into the mass spectrometer. After introduction, the sample is ionized (transformed into a charged species) and transferred into some type of ion analyzer. The ion analyzer sorts and separates the ions in such a manner in order that the ion detection and recording systems of the mass spectrometer may measure the mass and intensity of each different sample ion produced from the original sample. Since most ionization techniques carry a fair amount of energy relative to the chemical sample of interest, not only an intact molecular ion species will be present, but frequently these molecular species will fragment into smaller ions. The analysis of all these ions produced from a single chemical sample can often be related back to the original un-ionized chemical sample. The mass spectrum, or collection and tabulation of all these ions produced from a single chemical sample, is highly characteristic of the original chemical sample, and is often used as a "fingerprint" for identification of the sample.

In a preliminary search of U.S. patents, the following were noted:

| | |
|---|---|
| 2,767,317 - Wiley | 3,939,344 - McKinney |
| 3,480,775 - Osborne | 3,949,221 - Liebl |
| 3,590,243 - Perrin et al | 3,970,854 - Boroffka et al |
| 3,621,240 - Cohen et al | 3,999,065 - Briggs |
| 3,783,280 - Watson | 4,047,030 - Lobach |
| 3,842,266 - Thomas | 4,122,343 - Risby et al |
| 3,881,108 - Kondo et al | 4,439,679 - McIlroy et al |
| 3,931,516 - Fletcher et al | 4,521,687 - Naito |

The patents discovered by the search have revealed inventions and ideas relating to methods and devices which introduce the chemical samples, analyze the resultant sample ions, or detect the sample ions. Methods are actively being sought for maintaining high production of molecular ions while having selective control over fragmentation processes, in such a manner so as to produce fragment ions of interpretable, structural significance.

Renewed vigor in the examination of biological substances has resulted in recent innovations in analytical techniques in mass spectrometry. One area of mass spectrometry which recently has received considerable interest involves the determination of secondary ion mass spectra of chemical substances (1, 2, 2.5). The technique utilizes several means by which rapid energy deposition into a thin film of a chemical substance, which has been placed on the surface of an electrode in either the free state or as a suspension in a fluid matrix, causes sputtering (production of ions). One method of sputtering is fast atom bombardment (f.a.b.) of a sample, where the sample is introduced into the mass spectrometer and then bombarded with a beam of high energy (kilo-electron volts) neutral atoms. The fast-atom bombardment (f.a.b.) ion source will thus produce positive or negative secondary ions of the chemical substance under investigation by bombarding a suspension of the substance in a fluid matrix, deposited as a thin film on the surface of an electrode (3, 4). The method has quickly gained widespread acceptance; however, it has become evident that more extensive knowledge is necessary for a better understanding of the fundamental aspects of ion formation in order to facilitate spectral analysis.

The development and application of f.a.b. to the molecular weight determination of large, polar, thermally labile substances had been remarkably successful (1, 2). To date, most major classes of chemical compounds have been subjected to analysis by f.a.b. mass spectrometry. However, there is an ever-increasing quantity of published data which would indicate that many larger molecules of relevant biological interest do not yield ions from which significantly useful structural information can be deduced. Some instrumental parameters which affect the presence, or absence, and abundance of ions have been critically examined. Sample support surfaces (5–7), the liquid matrix (8–10), bombarding atoms (5, 6, 11), and modifications to the matrix (5–10) are some of the variables in the f.a.b. analysis which have been shown to affect the sensitivity and selectivity of f.a.b. ionization of various substances. While some aspects of the problem have been defined and delineated (12), the mechanism of ion formation under these conditions remains unresolved.

Summary of the Invention

It is an object of the present invention to overcome deficiencies in the prior art, such as indicated above.

It is another object to provide an improved system for fast atom bombardment mass spectrometry which utilizes an electrochemical sample probe having two electrodes.

It is a further of the object of the invention to improve the efficiency of mass spectrometry.

It is yet another object of the invention to provide a mass spectrometry system which enables analysis of samples which could not previously be so analyzed.

These and other objects will be apparent from the description given more completely below.

As mentioned above, there are various parameters which affect f.a.b. ionization, and one of these is the sample surface. Although used in various sizes, shapes and compositions, the sample surface has hitherto remained a single electrode. The present invention is based upon the use of plural electrodes which has now been discovered to produce significantly improved results. Information relating to the present invention in part has been made public or soon will be made public as delineated below.

1. J. E. Bartmess and L. R. Phillips, "A New Technique in FAB/MS OF Non-Polar Molecules", oral presentation at the 33rd Annual Conference on Mass Spectrometry and Allied Topics of the American Society for Mass Spectrometry, San Diego, Calif., May 28, 1985. FOF 1. Abstract about October or November, 1985.
2. J. E. Bartmess and L. R. Phillips, "Electrochemical Fast Atom Bombardment Mass Spectrometry", oral presentation at the 10th International Mass Spectrometry Conference, Swansea, United Kingdom, September, 1985. Paper 577.
3. J. E. Bartmess and L. R. Phillips, "Electrochemical Fast Atom Bombardment Mass Spectrometry", submitted to the *Journal Analytical Chemistry* for publication. Expected publication December, 1986.
4. J. E. Bartmess and L. R. Phillips, "New Developments in Electrochemical Fast Atom Bombardment Mass Spectrometry", to be orally presented at the 34th Annual Conference on Mass Spectrometry and Allied Topic of the American Society for Mass Spectrometry, Cincinnati, Ohio, June, 1986.

While f.a.b. mass spectrometry has had considerable success with polar biomolecules, it has not been as useful in the analysis of non-polar species. To a first approximation, the f.a.b. beam of neutral atoms vaporizes pre-formed ions in the fluid matrix. Some additional ionization by acid/base chemistry with the matrix occurs, but if the particular chemical sample is not amenable to such ion formation, it usually does not respond well to analysis by f.a.b. mass spectrometry. The desire, then, is to develop a general method where the ionic signal in f.a.b. mass spectrometry is independent of matrix or sample composition, but is still variable with some easily controlled experimental (instrumental) parameter.

A viable possibility comes from another branch of analytical chemistry, namely electrochemistry. Solution phase chemists (electrochemists) have generated ions from almost any molecule, using electrochemical techniques. Glycerol, a commonly used fluid sample matrix in f.a.b. mass spectrometry, can conduct electrical current easily. There is only limited knowledge available concerning its electrochemical behavior, however, due to its ionic diffusion coefficient being small relative to traditional fluids used as electrolytes; nonetheless, both reduction and oxidation chemistry can occur in glycerol.

Electrochemical control of the chemical substance present in the fluid has the advantages of being continuously variable, bi-modal in operation (both reduction and oxidation), can be varied while inside the mass spectrometer's vacuum system, is inexpensive to operate, and is easily achieved. The required modification (and hence the invention) is found in the sample probe itself, which is generally designed to be a removable device anyway. The combination of voltage (from the electrochemistry) and mass analysis provides for a multi-dimensional method of analysis, thus increasing the amount of chemical data available from single analysis.

Brief Description of Drawing

FIG. 3 is a schematic view showing a dual electrode f.a.b. sample probe in operation; and FIG. 4 is a circuit diagram showing electronic control of the disk electrode of a dual electrode type f.a.b. sample probe.

Detailed Description

Figure 2A:
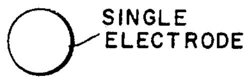
FIGS. 2A–2D provide a comparison through schematic views of single and dual electrode f.a.b. sample probes.
Figure 2C:
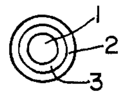
Figure 2B:
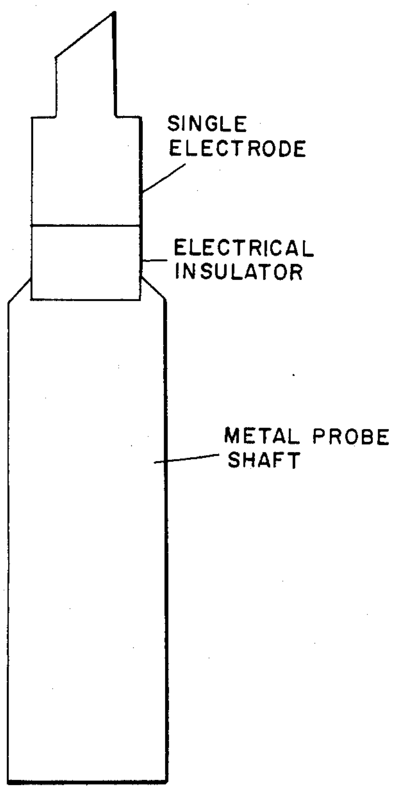
Figure 2D:
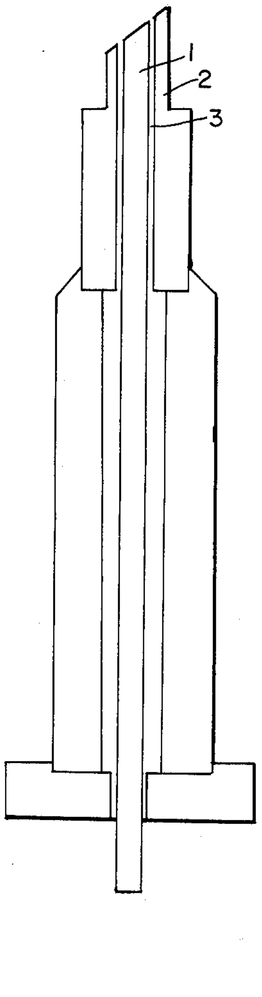

The electrode probe is, as indicated above, a key feature of the invention. FIGS. 2C and 2D show a disk electrode 1 and a disk electrode 2 separated by an insulator 3 for example of Teflon for use according to the present invention.

The "ring-disk" electrode configuration can be chosen for the electrochemical cell in order to maximize the working area consistent with the physical dimensions of the f.a.b. mass spectrometer sample probe. Thus, the conventional single electrode sample probe of FIGS. 2A and B is replaced with a two-electrode probe, where for instance the outer ring electrode is maintained at the mass spectrometer's ion source potential voltage, and the inner disk electrode (electrically insulated from the ring electrode) can be continuously varied over for instance ±15 volts with respect to the ring electrode, in view of each voltage source B1, B2 being two 9-volt batteries, as indicated in FIG. 4. It should be noted here that this electrode configuration can be changed as well as the choice of which electrode has its potential varied. Many different two-electrode configurations can be envisioned, and would have in common the same basic concepts. Other configurations can be selected depending on individual cases.

The construction of the prototype device was with a disk electrode of brass and a ring electrode of copper. Once again, many other metals may be used, and as with the field of electrochemistry, particular combinations of metals would be preferred for particular applications, but the same basic concepts apply to all cases.

Operation and application of the device of the present invention, electrochemical f.a.b. mass spectrometry (EFABMS) involves basic knowledge of electrochemical techniques and of f.a.b. mass spectrometry, as well as mass spectrometry in general, in order to approach particular applications. As general understanding of the merging of these two important techniques becomes clearer, broader usage demanding maximum data from minimum sample quantity should be recognized as a powerful new analytical tool in the analysis of chemical substances heretofore either unanalyzable or analyzable with insufficient data for total structural characterization.

EXAMPLES

Figure 1:
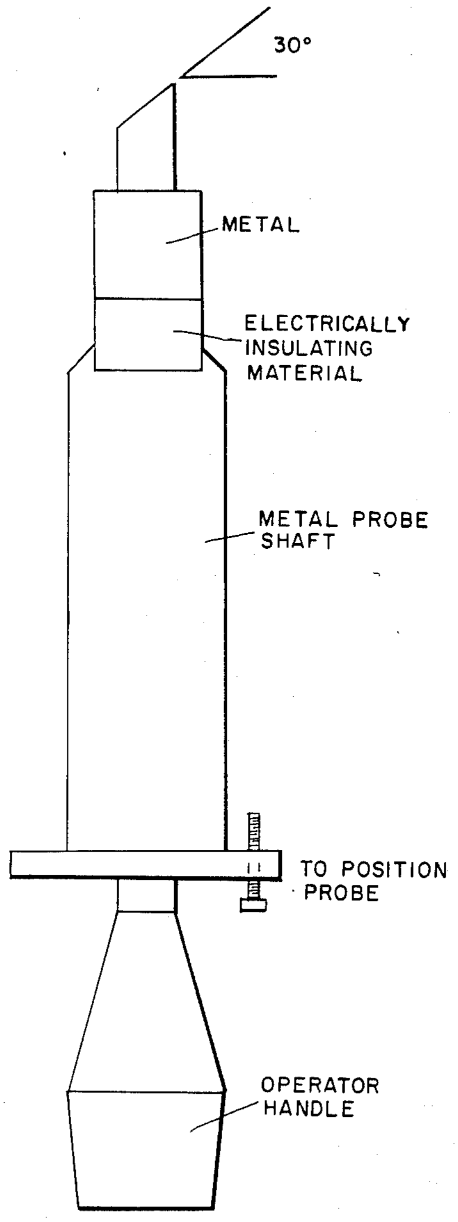
FIG. 1 is a schematic view showing features of a typical f.a.b. sample probe.

Features of a typical f.a.b. sample probe in current usage is depicted in FIG. 1. The dimensions shown are approximate in order to give an indication of the relative size of the device. Exact measurements depend upon the mass spectrometer (sample inlets vary between instrument models, even of the same manufacturer). However, there are two features common to the f.a.b. sample probes now in use; (one) an angled sample surface integrated into (two) a single electrode.

The comparative differences between the single- and dual-electrode f.a.b. sample probe are shown in FIGS. 2A–D. (Note that the outer dimensions of both probes are illustrated in this example to be the same). In order to minimize experimental bias towards a sample, the "ring-disc" electode pair configuration was chosen for its omni-directionality. The prototype was constructed with the copper "ring" electrode electrically isolated with teflon from the brass "disc" electrode. The metals used in construction of the prototype probe were chosen as typical metals for the electrodes, which can be selected of any type. For instance a metal plating kit is commercially available so that the electrode's surface exposed to the sample may be changed to copper, silver, gold, or any of several other metals. It can be noted in FIG. 2 that the "disc" electrode extends rearward throughout the length of the entire sample probe and through the operator's handle. To this is attached the electronic circuit (shown in FIG. 4) which is under operator control, so that the voltage potential of the "disc" electrode with respect to the "ring" electrode can be varied.

FIG. 3 shows the position of the sample probe in operation. Since outer dimensions are essentially identical, the dual-electrode sample probe merely replaces the single-electrode probe in use. There is no modification to the mass spectrometer, other than connecting the electronic circuit (FIG. 4) to the ion accelerating potential (Vacc) of the mass spectrometer. The electronic circuit used to operate the dual-electrode sample probe is essentially a voltage divider with an improved current output (FIG. 4).

In operation, the sample to be investigated is added to a suitable matrix (usually glycerol, though other materials can be and have been used) and the mixture is deposited on the sample surface of the probe within the mass spectrometer. The electronic control circuit of the dual-electrode sample probe is adjusted to give a potential difference between the "ring" and "disc" electrodes of zero volts, essentially forcing the probe to behave as a single-electrode probe. (When operated in this manner, there was no significant difference in sample ion beam intensity between this probe and the standard, single-electrode f.a.b. sample probe). Bombardment of the sample with a beam of fast atoms is commenced, and the mass spectrometer is tuned to produce the best possible beam of sample ions in terms of both beam intensity and definition. Although in practice it has been found that the mass spectrometer may be tuned with a pre-existing voltage potential difference as large as +16 or −16 volts between the "ring" and "disc" electrodes of the probe, comparative studies between the operation of single- and dual-electrode f.a.b. sample probes appear more meaningful with an initial equi-potential setting of the dual-electrodes. Once the mass spectrometer has been optimally tuned, the various effects of varying the potential difference between the "ring" and the "disc" electrodes may then be determined and adjusted for.

The utilization of the dual-electrode, fast-atom bombardment sample probe in mass spectrometric analysis of chemical substances appears to hold several advantages over the traditionally-used single-electrode, fast-atom bombardment sample probe: increased ion production, increased production of structurally significant fragment ions, and the ability to provide a direct means to study electrochemical reactions.

Mass spectra were recorded with a Kratos MS-50 mass spectrometer equipped with a Kratos DS-55 data system (Data General Nova 4X minicomputer, employing the RDOS operating system). The unheated, f.a.b. ion source was at room temperature, and the accelerating potential was 8 kV. Fast-atom bombardment mass spectra were scanned from samples introduced directly into the ion source as collodial suspensions in a glycerol sample-matrix placed on either a copper, single-electrode sample surface, or a copper/brass dual-electrode sample surface; bombardment was with a 20-uA beam of 7.5 keV xenon fast atoms generated in a Saddle-Field neutral-beam gun (13) (Ion Tech Ltd, Teddington, England).

The various chemicals used in this work were A.C.S.-certified, reagent-grade materials, or the equivalent, and were used without purification.

Preliminary use of the dual-electrode f.a.b. sample probe has been intriguing and has justified further investigation of the observed phenomena for understanding and appropriate application. Several observations warrant brief description. First, there is a marked increase in ion density of the matrix and matrix-sample mixture-related ions (two to ten-fold increase), without loss of sample ion beam definition in the mass spectrometer. Secondly, some chemical substances which have not been observed to yield fragment ions of structural significance under f.a.b. ionization using the single-electrode sample probe, do yield intense, structurally significant fragment ions with the use of the dual-electrode sample probe. Thirdly, chemical substances which do not dissolve or suspend well in the liquid matrix typically do not yield useful f.a.b. mass spectral data, whereas the same samples sometimes yield intense f.a.b. mass spectra with the use of the dual-electrode sample probe. Finally, a measurable current can be observed between the electrodes of the dual-electrode sample probe when a sample mixture is deposited on the electrode's surface, thus fulfilling a preliminary requisite for electrochemical reactions to occur. Indeed, electrochemical reactions have been observed with the use of the dual-electrode sample probe.

It will be obvious to those skilled in the art that various changes may be made without departing from the scope of the invention and the invention is not to be considered limited to what is shown in the drawings and described in the specification.

REFERENCES

1. A. L. Burlingame, A. Dell, and D. H. Russell *Anal. Chem.*, 54 (1982)363R–409R. Review.
2. Burlingame, J. O. Whitney, and D. H. Russell *Anal. Chem.*, 56 (1984) 417R–467R. Review.
2.5 A. L. Burlingame, T. A. Baillie and P. J. Derrick *Analytical Chemistry*, 58 (1986) 165R. Review.
3. M. Barber, R. S. Bordoli, R. D. Sedgwick, and A. N. Tyler *J. Chem. Soc. Chem. Commun.*, (1981) 325–327.
4. D. J. Surman and J. C. Vickerman *J. Chem. Res.* (S), 6 (1981) 170–171.
5. S. A. Martin, C. E. Costello, and K. Biemann *Anal. Chem.*, 54 (1982) 2362–2368.
6. A. M. Buko, L. R. Phillips, and B. A. Fraser *Biomed. Mass Spectrom.*, 10 (1983) 324–333.
7. L. R. Phillips, O. Nishimura, and B. A. Fraser *Carbohydr. Res.*, 121 (1983) 243,255.
8. C. Fenselau *Anal. Chem.*, 54 (1982) 105A–116A.
9. J. Meili and J. Seibl *Int'l. J. Mass Spectrom. Ion Phys.*, 46 (1983) 367–370.
10. W. D. Lehmann, M. Kessler, and W. A. Konig *Biomed. Mass Spectrom.*, 22 (1984) 217–222.

11. H. Kambara *Org. Mass. Spectrom.*, 17 (1982) 29–33.
12. A. Benninghoven, editor, "Ion Formation from Organic Solids", Springer Series in Chemical Physics, 25, Spriner-Verlag, Berlin, 1983.
13. W. V. Ligon, Jr. *Int. J. Mass Spectrom. Ion Phys.*, 41 (1982) 205–208.

What is claimed is:

1. In an f.a.b. mass spectrometer, the improvement wherein the electrode sample proble is of the dual-electrode type with at least two electrodes insulated from each other, potential means is provided for applying a potential difference between said electrodes, an ion beam produced by said mass spectrometer bombards said sample probe with a sample distributed across adjoining surfaces of said at least two electrodes, and said at least two insulated electrodes of said dual-electrode type of sample are arranged so that current flows via said sample between said at least two electrodes as a result of said potential difference.

2. A device according to claim 1, said sample probe comprising two of said electrodes, wherein said two electrodes are in the form of a central disk electrode surrounded by a ring electrode.

3. A device according to claim 1, wherein said potential means is such that a first one of said electrodes is provided with a constant voltage, and the potential of the other electrode is varied selectively over approximately $\pm 15$ volts with respect to the first electrode.

4. A device according to claim 1, wherein one said electrodes is formed of brass and the other is formed of copper.

5. A fast-atom-bombardment mass spectrometer, comprising mass spectrometer means for producing a beam of fast particles and for analyzing the mass of ions produced by said fast particles, a sample holder for containing thereon a sample, to be bombarded by said fast particles for producing said ions, wherein said sample holder comprises plural electrodes, insulated from each other and being arranged so that a respective surface of at least one of said electrodes is exposed to said beam of fast particles, and voltage means for applying a voltage difference between said dual electrodes, wherein said sample is distributed on said sample holder to provide a current in said sample between said insulated electrodes.

6. The device of claim 5, said sample holder comprising two of said electrodes and an insulator therebetween, and said sample holder having a surface on which said sample is provided to extend on respective surfaces of said electrodes and insulator, so that said voltage difference results in current through said sample and respective ions being provided for said mass analyzing.

7. The device of claim 6, said plural electrodes consisting of a ring electrode and a disc electrode.

8. The device of claim 5, said sample holder comprising two of said electrodes and an insulator therebetween, and said sample holder having a surface on which said sample is provided to extend on respective surfaces of said electrodes and insulator, so that said voltage difference results in current through said sample and respective ions being provided for said mass analyzing.

9. The spectrometer of claim 1, wherein said potential difference between each adjacent pair of said electrodes is on the order of a few tens of volts.

10. The device of claim 5, wherein said potential difference between each adjacent pair of said electrodes is on the order of a few tens of volts.

11. The device of claim 2, wherein said potential difference between each adjacent pair of said electrodes is on the order of a few tens of volts.

12. The device of claim 7, wherein said potential difference between each adjacent pair of said electrodes is on the order of a few tens of volts.

13. In an f.a.b. mass spectrometer, the improvement wherein the electrode sample probe is of the dual-electrode type with two electrodes insulated from each other, and potential means is provided for applying a potential difference between said electrodes, an ion beam produced by said mass spectrometer bombards said sample probe with a sample distributed across adjoining surfaces of said at least two electrodes, said at least two insulated electrodes of said dual-electrode type of sample are arranged so that current flows via said sample between said at least two electrodes as a result of said potential difference, and said two electrodes are in the form of a central disk electrode surrounded by a ring electrode.

14. A fast-atom-bombardment mass spectrometer, comprising mass spectrometer means for producing a beam of fast particles and for analyzing the mass of ions produced by said fast particles, a sample holder for containing thereon a sample to be bombarded by said fast particles for producing said ions, wherein said sample holder comprises two parallel electrodes insulated from each other by an insulator, voltage means for applying a voltage difference between said two electrodes, wherein said sample is distributed on said sample holder to provide a current in said sample between said insulated electrodes, said sample holder having a surface on which said sample is provided to extend on respective surfaces of said electrodes and insulator, so that said voltage difference results in current through said sample and respective ions being provided for said mass analyzing, and said two electrodes being a ring electrode and a disc electrode.

* * * * *

UNITED STATES PATENT AND TRADEMARK OFFICE

CERTIFICATE OF CORRECTION

PATENT NO. : 4,719,349

DATED : January 12, 1988

INVENTOR(S) : Phillips et al

It is certified that error appears in the above—identified patent and that said Letters Patent is hereby corrected as shown below:

Colum 7, line 10: change "proble" to read --probe--;

line 34: change "electrodes" to read --electrode--

Signed and Sealed this

Sixth Day of September, 1988

*Attest:*

DONALD J. QUIGG

*Attesting Officer*

*Commissioner of Patents and Trademarks*